United States Patent [19]

McGillem et al.

[11] 4,079,221
[45] Mar. 14, 1978

[54] MICROWAVE OVEN HAVING WAVEGUIDE FEED WITH PHASE SHIFTER

[75] Inventors: Clare D. McGillem; Robert L. Gunshor, both of West Lafayette, Ind.

[73] Assignee: Roper Corporation, Kankakee, Ill.

[21] Appl. No.: 677,446

[22] Filed: Apr. 15, 1976

[51] Int. Cl.² .............................................. H05B 9/06
[52] U.S. Cl. ...................... 219/10.55 F; 219/10.55 M
[58] Field of Search .................. 219/10.55 F, 10.55 R, 219/10.55 M

[56] References Cited

U.S. PATENT DOCUMENTS 3,949,184  4/1976  Freedman ..................... 219/10.55 E

FOREIGN PATENT DOCUMENTS 664,926  1/1952  United Kingdom .......... 219/10.55 F

*Primary Examiner*—Arthur T. Grimley
*Attorney, Agent, or Firm*—Leydig, Voit, Osann, Mayer & Holt, Ltd.

[57] ABSTRACT

A microwave oven using a waveguide feed to deliver microwave energy from a magnetron source to an oven cavity, wherein a substantially reflectionless phase shifter is interposed in the waveguide for adjusting the electrical characteristics thereof to cause the magnetron to operate efficiently and safely. The phase shifter is dimensioned to match the impedance of the oven cavity and load to that required by the magnetron by adjusting the electrical characteristics of the waveguide so that such adjustment may be carried out without the need for changing the physical configuration of the oven or waveguide. The phase shifter is dimensioned to adjust the average impedance of the cavity and load when the cavity is heavily loaded to cause the magnetron to operate in its maximum power delivery region, and to adjust the aforementioned impedance under conditions of light load to cause the magnetron to operate in a safe region. The phase shifter, thus, not only aids in achieving maximum power delivery, but also serves to protect the magnetron.

12 Claims, 6 Drawing Figures

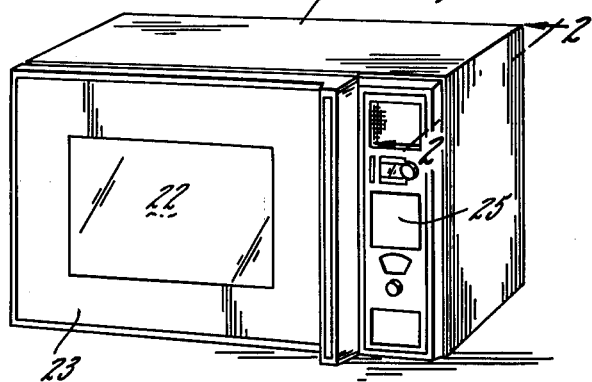
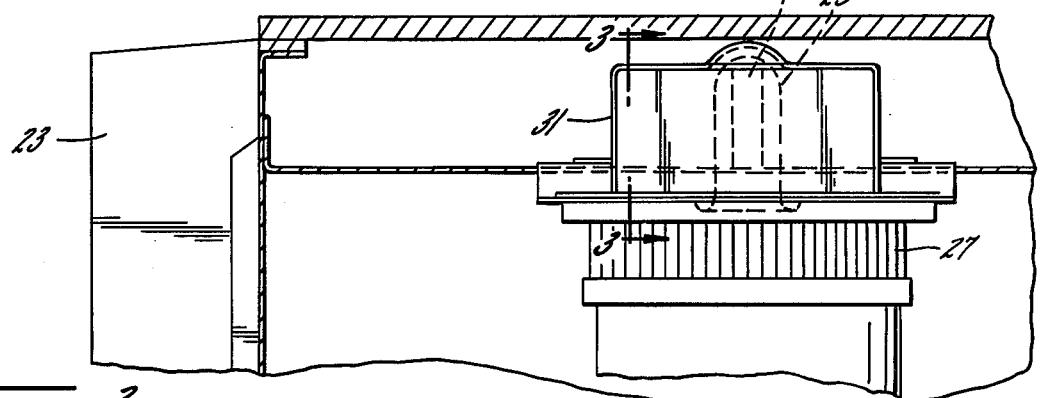
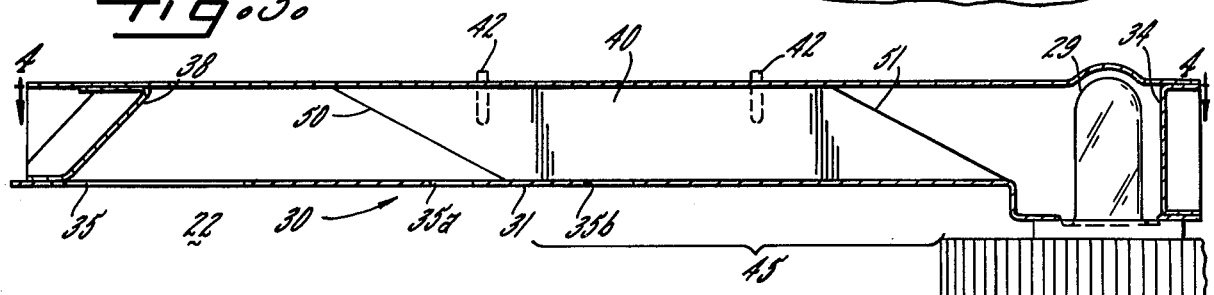
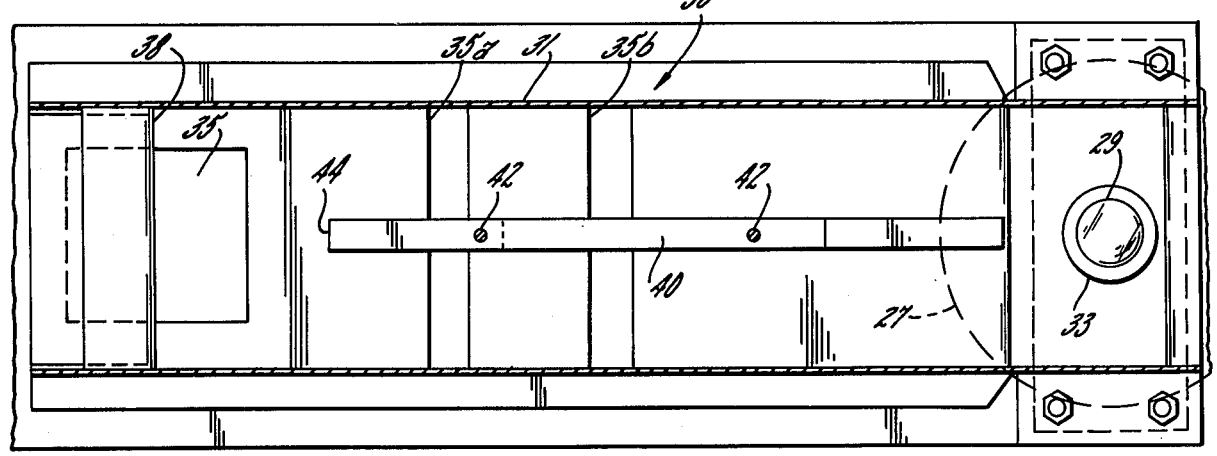

MICROWAVE OVEN HAVING WAVEGUIDE FEED WITH PHASE SHIFTER

This invention relates to microwave ovens, and more particularly to those using waveguide transmission techniques for coupling energy between a microwave source and the oven cavity.

As a general proposition, the problem exists in microwave ovens of matching the impedances (or average impedances) of the microwave cavity in combination with various loads to the values desired by the microwave source. Because the magnetron which serves as the microwave source is an efficient self excited oscillator, mismatching of impedances may cause instability capable of damaging or destroying the magnetron. In short, the performance characteristics of a magnetron, such as output power and operating frequencies, depend on the load presented thereto. Generally, manufacturers illustrate the characteristics of their particular magnetron types on a polar plot known as a Rieke diagram, the coordinates of which express load impedance in terms of phase and magnitude of the reflection coefficient at the magnetron antenna. Of primary interest is the phase which is represented as the position of a voltage minimum from the magnetron antenna.

A typical Rieke diagram for a magnetron will show lines of constant frequency and of constant power, and will indicate the regions in which safe magnetron operation is possible. The diagram will show a region of maximum power delivery, such region being desirable for efficient, high power operation. Operating regions to be avoided as unsafe are the sink and anti-sink regions, also shown on the diagram. In the sink region, moding may occur and unstable operation will result. In the anti-sink region, anode dissipation increases, with attendant heat generation and potentially destructive temperature rise. A further unsafe region sometimes occurs when reflected energy presented to the antenna envelope (the antenna vacuum seal cover) becomes excessive, causing the envelope to fail. Generally this occurs in high power regions when operating under light load, when the VSWR (voltage standing wave ratio) is high.

In the context of a waveguide feed microwave oven, impedance matching has generally been approached by configuring the energy feed system so that the physical length of the waveguide coupling the magnetron to the oven cavity is designed to achieve an equivalent impedance of cavity, waveguide and load which establishes a desired operating region for the magnetron. Because magnetrons of different design may have different operating characteristics, it will be appreciated that a finalized design of microwave cavity and feed structure would tend to lock that design to a particular supplier of magnetrons.

In configuring the feed systems to achieve this impedance match, it has generally been common to concentrate on power delivery, or operation of the magnetron in its maximum power region, while using other measures to protect the magnetron. For example, an anode thermostat is usually provided to deenergize the magnetron before damage occurs in the anti-sink region. To avoid damage from excessive reflected energy when the microwave generator is energized for high power operation, but the microwave cavity is only lightly loaded, oven sensors have been used, or matching objects placed within the oven cavity.

With the foregoing in mind, it is a general aim of the present invention to provide a waveguide feed system for a microwave oven using a substantially reflectionless phase shifter for matching the impedance of the cavity-load-feed system to that of the microwave source in such a way as to cause the source to produce high power when the cavity is heavily loaded, and to operate safely under conditions of light load. More specifically, it is an object to provide such a feed system wherein a phase shifter is interposed in the waveguide to adjust the impedance of the cavity presented to the source so that the impedance presented to the source in the heavily loaded condition causes the source to operate in its maximum power region, and so that the impedance presented to the source in the lightly loaded condition causes the source to operate in a safe region.

In accomplishing the foregoing, it is an object of the present invention to provide the aforementioned impedance adjustment using a dielectric slab fixed in position in the waveguide, the slab being dimensioned:
  (a) to adjust the average impedance when the cavity is heavily loaded to cause the source to operate in the maximum power region, and
  (b) to adjust the average impedance when the cavity is lightly loaded to cause the source to operate in a safe region.

Thus, it is an object to allow interchange of components, such as microwave sources, without the need for physically reconfiguring the waveguide feed or cavity structure, simply by providing a new, properly dimensioned dielectric slab.

Other objects and advantages will become apparent from the following detailed description when taken in conjunction with the drawings in which:

FIG. 1 is a perspective view of a microwave oven incorporating a waveguide feed with phase shifter illustrating the present invention;

FIG. 2 is a sectional view taken generally along the lines 2—2 of FIG. 1;

FIG. 3 is a sectional view taken generally along the lines 3—3 of FIG. 2 and showing the dielectric phase shifter in front elevation;

FIG. 4 is a sectional view in plan taken along the lines 4—4 of FIG. 3;

Figure 5:
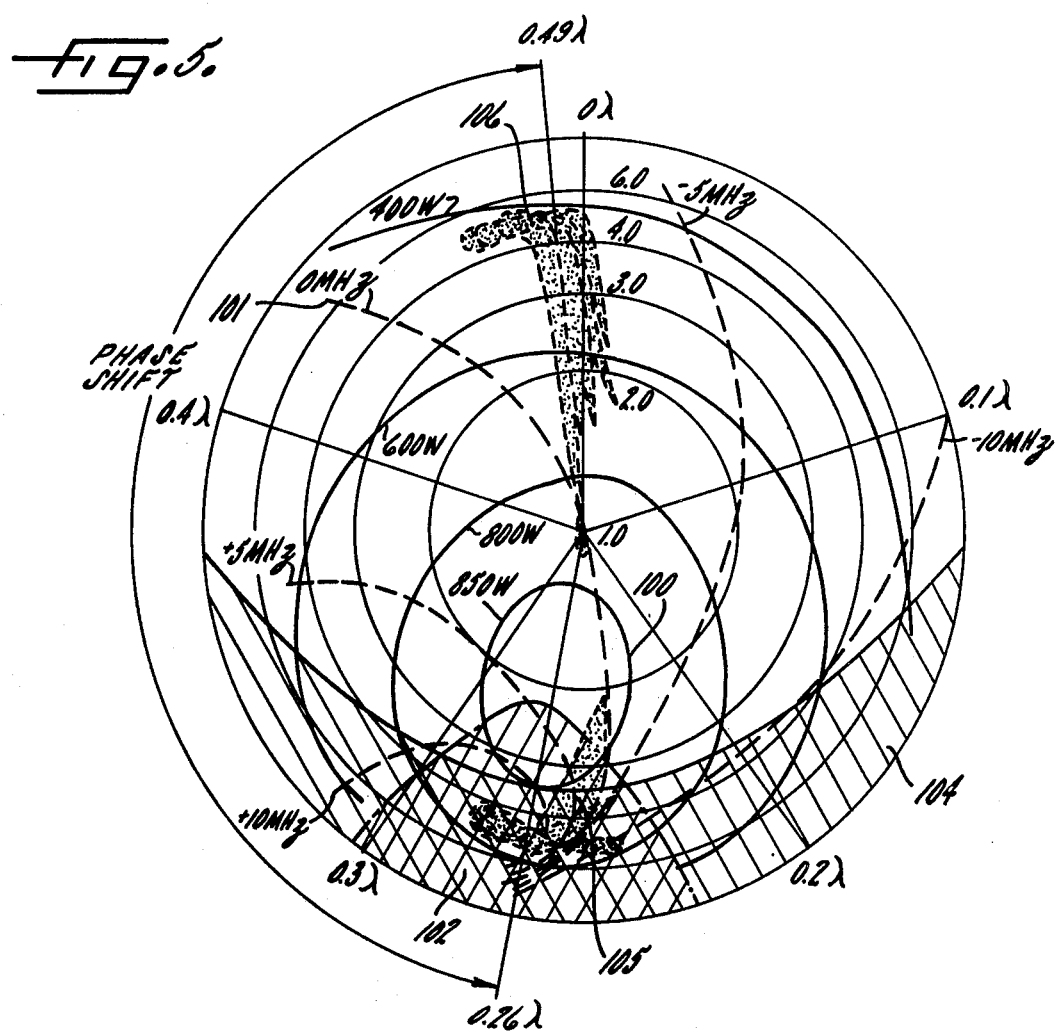
FIG. 5 shows a Rieke diagram illustrating a particular application of a phase shifter according to the present invention.

While the invention will be described in connection with a preferred embodiment, there is no intent to limit it to that embodiment. On the contrary, the intent is to cover all alternatives, modifications and equivalents within the spirit and scope of the invention as defined by the appended claims.

Turning to the drawings, there is illustrated a microwave oven, generally indicated at 20, which, in the present instance is of the portable or countertop variety. It will be apparent, however, that the teachings of the present invention are applicable generally to microwave ovens having waveguide feed system, including those of the kitchen range, floor standing variety.

The illustrated oven 20 is defined by a generally rectangular case 21 enclosing a generally rectangular oven cavity 22 closed at the front by a hinged door 23. The door 23, which in the present instance is hinged at the left as shown in FIG. 1, includes appropriate sealing elements arranged around the periphery thereof to prevent the escape of microwave radiation. An operating panel 25 includes the necessary switches, timers and the like for controlling the operation of the microwave source. Disposed behind the operating panel 25, in a chamber sealed from the cavity 22, are the electronic elements of the oven, including the microwave source 27. The source 27 is typically a commercially available magnetron, characterized as described above, and capable of generating energy at frequencies in the microwave range, such as 2450 mHz.

As best shown in FIGS. 2 and 3, the magnetron has an antenna envelope 29 from which the microwave energy is emitted, the envelope being positioned in a waveguide feed generally indicated at 30. The waveguide feed is adapted to conduct energy developed by the magnetron into the microwave cooking cavity. To that end, the feed 30 includes a waveguide 31, generally rectangular in section as shown in FIG. 2, having an aperture 33 through which the envelope 29 of the magnetron 27 is projected. The magnetron end of the waveguide 31 is closed by waveguide end member 34.

For coupling the energy generated by the microwave source to the oven cavity, the waveguide 31 includes a large aperture 35 and smaller slit apertures 35a and 35b, all of the apertures opening into the cavity 22. Preferably, the aperture 35 is located approximately centrally of the cavity so as to evenly distribute energy through said cavity. The illustrated feed configuration may generally be characterized as an iris feed or 3 iris system. However, the invention is not limited to the illustrated feed system, generally any means for coupling energy from the waveguide to the cavity being usable. For example, various antenna systems may be applied, including antennas of the static and rotational variety. In addition, a mode stirrer may be used, if needed, to increase the uniformity of energy distribution.

For closing the feed end of the waveguide an end member 38 is fixed thereacross, and is preferably arranged at an angle as shown in FIG. 3 so as to minimize the reflection of energy back to the magnetron envelope 29.

Considering the elements described thus far, it will be apparent that the cavity 22, the load placed therein and the feed structure 30 will present an impedance to the magnetron 27 determining the operating point of the magnetron. As noted above, it has heretofore been common to fix the dimensions of the waveguide 31 so that the equivalent impedance presented to the magnetron in cases of typical load causes the magnetron to operate in its maximum power region.

In accordance with the present invention, the dimensions of the waveguide 31 may be established independently of the impedance requirements of the magnetron, and the electrical characteristics of the feed system tailored by a phase shifter 40 interposed in the waveguide to adjust the equivalent impedance presented to the magnetron. As shown in the drawings, the phase shifter 40 is fixed in position centrally (as shown in FIG. 2) of the waveguide and intermediate the magnetron and antenna apertures (as shown in FIG. 3). The phase shifter 40 is held in position by appropriate pins 42, preferably of a dielectric or non-metallic material, protruding through the upper wall of the waveguide into the phase shifter itself. The phase shifter 40 is constructed of dielectric material having predetermined electrical characteristics, preferably of polypropylene. The dimensions of the phase shifter, the thickness 44 as illustrated in FIG. 4, and the length 45 as illustrated in FIG. 3, are established to adjust the equivalent impedance of the load, cavity and feed presented to the magnetron to cause the magnetron to operate as described in detail herein. In dimensioning the phase shifter, it is first necessary to determine the actual operating regions of the magnetron in the particular oven configuration, with no phase shifter in the waveguide, and under the load conditions of interest. These actual operating regions are compared with the desired regions as shown by the Rieke diagram of the magnetron. If the actual regions are not optimum, the amount of phase shift needed to move the operating points into favorable regions is determined. A dielectric slab may then by dimensioned, using characteristic data available to those working in the art, to approach the desired phase shift. The operating points of the magnetron, with this phase shifter in the waveguide are again determined for the load conditions of interest. This data, along with that obtained previously, not only shows the new operating points, but also illustrates the paths in which the points for the various load conditions moved in response to the phase shift. This combined information, i.e., the adjusted operating points and the paths in which such points moved when adjusted, is used as a basis for re-dimensioning the phase shifter to refine the operating points into the high power region for heavy loads and into safe, stable regions for light loads.

More specifically, the phase shifter is ultimately dimensioned to achieve the best possible balance among the following factors. As a first criteria for dimensioning the dielectric slab 40, the equivalent impedance of a heavily loaded cavity, that is the impedance of the load, cavity and feed, as presented to the source is established so as to cause the magnetron to operate in its region of maximum power. However, a further important criteria is that of high power but under light load. In the light load case, such as with an empty cavity, the equivalent impedance of the minimal load, cavity and waveguide is established so that the magnetron operates in a safe region. More specifically, the operating point of the magnetron under these conditions is adjusted to avoid the anti-sink region and also to avoid regions where excessive energy would be reflected to the source (high VSWR) in the high power region. The phase shifter 40 shifts the impedance presented to the magnetron so as to shift the operating point thereof to a safe region, away from the high power and anti-sink regions. Knowledge of the paths in which the operating points for the various loads travel in response to adjustment allows the dimensions of the phase shifts to be refined, moving the high power operating points as close as possible to the maximum power region, while retaining the light load operating points in safe regions.

To further prevent high VSWR from detrimentally affecting the magnetron or its operating points, the faces 50, 51 of the phase shifter 40 are cut at an angle so as to prevent the phase shifter itself from introducing a discontinuity, and thus setting up localized reflections. It is noted that previous attempts have been made to tune microwave feed systems, such as by using stub tuners or the like. However, these systems suffer from the disadvantage of introducing discontinuities into the feed system, setting up localized reflections and thus causing matching losses. In the present instance, the phase shifter 40, by virtue of the bias cut faces 50, 51 introduce substantially no discontinuity in the feed system, thus being characterized as substantially reflectionless, allowing operation without setting up localized reflections.

Even after the optimum feed system including phase shifter is achieved, it is entirely possible to change magnetron sources, and electrically modify the feed system to match the new source simply by constructing a new dielectric slab compatible with the new magnetron in the manner described above. Thus by virtue of the principles taught herein, a microwave oven system need not become locked to a single supplier of magnetrons. Further, because the operating points for the various load conditions can be adjusted, one against the other, the phase shifter, when dimensioned, may be fixed in position, requiring no positional adjustment for different load conditions.

The following example, summarizing a situation actually encountered, is offered as an example of the manner in which a phase shifter according to the invention was constructed to adjust the operating points of a magnetron in a microwave oven so as to optimize the heavy load points while restraining the light load points within safe regions, in this particular case, of lower power. In this situation a magnetron was used having operating characteristics generally as shown in the Rieke diagram of FIG. 5. First, referring generally to the nature of the Rieke diagram, it is seen that the diagram includes an arrangement of concentric circles which indicate the reflection factor or VSWR, the center indicating a VSWR of 1, and the progressively larger circles indicating higher VSWR's as shown. A series of straight lines radiate from the center and, as indicated on the perimeter of the chart, are calibrated in fractional wavelengths, indicating the phase position of the first minimum of the electric field from the reference plane, taken at the magnetron antenna.

The magnetron operating characteristics are plotted on this diagram as functions of VSWR and phase, the characteristics of the particular magnetron of interest being shown in FIG. 5. Areas of constant power are indicated, for example, operation within the elliptical area 100 causing the magnetron to deliver at least 850 watts. Lines of constant frequency are also plotted, line 101 showing 0 mHz or operation at the nominal operating frequency, and further lines, deviating in the positive or negative direction, spaced therefrom. The typical characteristic also shows the electronic limiting zone or sink region 102 shown at the lower portion of the diagram and cross hatched from upper right to lower left. The characteristics of the sink region were described above.

Testing of this magnetron revealed an operating region wherein high energy reflections back to the magnetron caused excessive anode heating and potential destruction of the antenna envelope. This area is shown on the diagram at 104 and is indicated by cross hatching from upper left to lower right. It is seen that for this magnetron this unsafe region occupied the area on the Rieke diagram of standing wave ratios greater than 3.5 in the phase region where the voltage minimum was at a distance of 0.125 wavelengths through 0.375 wavelengths from the magnetron antenna.

The oven structure in which this magnetron was used presented an impedance to the magnetron in the heavy load condition which caused the system to operate in the favorable, high power region, with a VSWR of 1.5 or less. However, the impedance plot in the light load condition, indicated by the stippled region 105, was found to be in the excessive antenna temperature region 104, raising the possiblity of destroying the magnetron when operating with the oven lightly loaded or empty. The centroid of impedances of the plot 105 had a VSWR of 5 with a voltage minimum at 0.26 wavelengths from the antenna.

Figure 6:
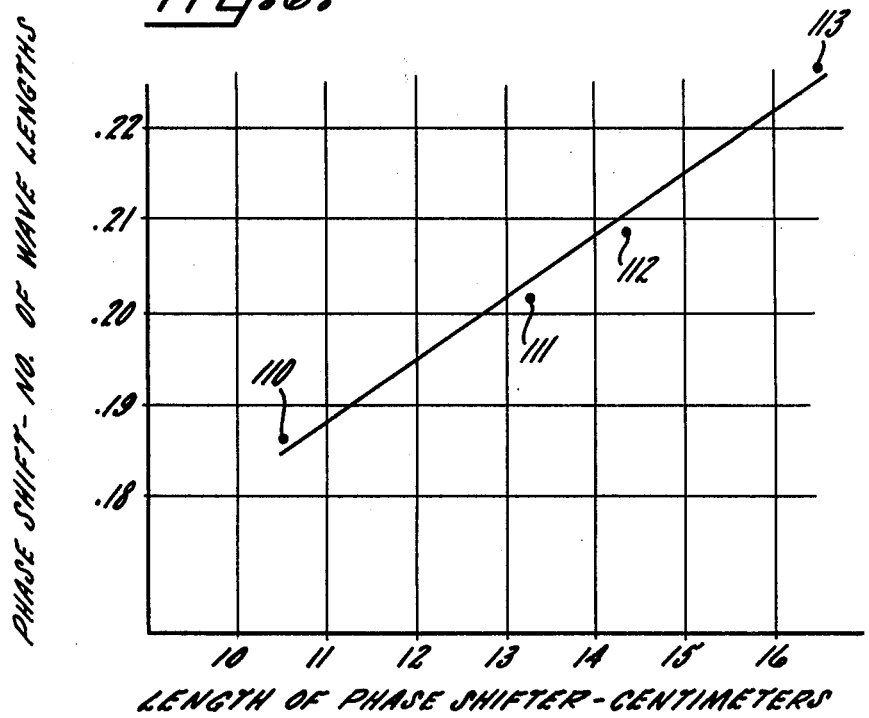
FIG. 6 shows a plot of phase shift versus dielectric slab length for the environment illustrated in FIG. 5.

On inspection of the Rieke diagram, it was found that in order to correct this situation, it was necessary to shift the light load impedance plot approximately 0.2 wavelengths from the area 105, without increasing the existing low magnitude of reflection coefficient for heavier loads, thereby keeping the heavy load impedance in or near the maximum power region. To accomplish this, polypropylene phase shifters having a height of 1.25 inches and a width of 0.375 inches were constructed in various lengths to determine the optimum phase shifter necessary to correct the situation. The graph of FIG. 6 shows the characteristics of such phase shifters, being a plot of the amount of phase shift obtained as a function of the length of the phase shifter formed of the aforementioned material. Four phase shifters were constructed having lengths indicated at 110–113 of FIG. 6, and such phase shifters were inserted in the waveguide and the amount of phase shift obtained was measured. Noting both the direction in which the impedance plot shifted and the amount of shift obtained with the introduction of a particular phase shifter, allowed the length of the phase shifter to be efficiently optimized. Ultimately a phase shifter formed of a polypropylene slab 0.375 inches by 1.25 inches by 6.625 inches was used to move the light load impedance plot approximately 0.23 wavelengths from its initial position. The impedance plot with such a phase shifter fixed in place in the waveguide is indicated by the stippled region 106 in FIG. 5. As shown, the centroid of impedances was moved about 0.23 wavelengths to produce a voltage minimum at about 0.49 wavelengths, safely distant from the moding region 102 and the excessive temperature region 104. In addition, because the phase shift was obtained without substantial discontinuity, the low reflection coefficient for other load conditions was not substantially affected, maintaining those load conditions in the high or relatively high power regions. It is emphasized that other tuning means based upon scattering principles would be incapable of producing this large phase shift without adversely affecting the impedance of other loads.

We claim as our invention:

1. In a microwave oven having an oven cavity, a source of microwave energy, and a waveguide coupling said source to said cavity, said source being stable and adapted to deliver maximum power when loaded within a predetermined impedance range, the cavity and waveguide being characterized by an average impedance range presented to said microwave source which mismatches said predetermined impedance range, the improvement comprising, impedance adjusting means including a phase shifter fixed in the waveguide for adjusting the average impedance of the cavity and waveguide as presented to the source, said phase shifter being dimensioned:

(a) to adjust the impedance of the cavity, waveguide and load presented to the source under conditions of heavy load in said cavity to be substantially equal to said predetermined impedance thereby to transfer maximum power from said source to the load, (b) to adjust the impedance of the cavity, waveguide and load presented to the source under conditions of light load in said cavity to cause said magnetron to operate in a safe region, and (c) to introduce a phase shift without localized discontinuity for maintaining the magnitude of standing waves existing in the waveguide.

2. The improvement as set forth in claim 1 wherein the phase shifter is a slab of dielectric material fixed in position in the waveguide with the longer dimension of the slab generally parallel to the waveguide walls.

3. The improvement as set forth in claim 2 wherein the dielectric slab is formed so that the front and rear faces thereof are at an angle with respect to the perpendicular height of the waveguide, whereby a phase shift is introduced without substantial discontinuity.

4. The improvement as set forth in claim 1 wherein the waveguide is closed by end members at the source and cavity ends thereof, the end member at said cavity end being positioned at an angle with respect to the perpendicular height of said waveguide thereby to minimize reflection of energy back to said source.

5. In a microwave oven having an oven cavity, a variable cooking load, a source of microwave energy, and a waveguide coupling said source to said cavity and load, said source being characterized by stable operation in a maximum power delivery region, by safe operating regions, and by an unstable operating region, the cavity, cavity loads, and waveguide presenting impedance characteristics to the source which establish the operating regions thereof, the improvement comprising impedance adjusting means including a phase shifter fixed in the waveguide for adjusting the impedance of the cavity, load and waveguide presented to said source, said phase shifter being dimensioned:

(a) to adjust the average impedance when the cavity is heavily loaded to cause said source to operate in said maximum power delivery region, and (b) to adjust the average impedance under conditions of light load in said cavity to cause said source to operate in said safe region, thereby to deliver maximum power to a heavy load while protecting said source under conditions of light loads and preventing operation in said unstable region.

6. The improvement as set forth in claim 5 wherein the phase shifter is a slab of dielectric material fixed in position in the waveguide with the longer dimension of the slab generally parallel to the waveguide walls.

7. The improvement as set forth in claim 6 wherein the dielectric slab is formed so that the front and rear faces thereof are at an angle with respect to the perpendicular height of the waveguide, whereby a phase shift is introduced without substantial discontinuity.

8. The improvement as set forth in claim 5 wherein the waveguide is closed by end members at the source and cavity ends thereof, the end member at said cavity end being positioned at an angle with respect to the perpendicular height of said waveguide thereby to minimize reflection of energy back to said source.

9. In a microwave oven having an oven cavity, a variable cooking load, a source of microwave energy, and a waveguide coupling said source to said cooking load, said source being characterized by stable operation in a maximum power delivery region, by safe operating regions, and by an unstable operating region, the cavity, cavity loads, and waveguide presenting impedance characteristics to the source which provide a VSWR under heavy load near the maximum power delivery region but an operating point under light load which is in an unsafe region, the improvement comprising impedance adjusting means including a phase shifter fixed in the waveguide for adjusting the impedance of the cavity, load and waveguide presented to said source, said phase shifter being dimensioned to introduce a phase shift in the waveguide sufficient to shift the light load operating point a fractional number of wavelengths from said unsafe region to said safe region while maintaining the existing VSWR so as to maintain the operating point under heavy load in the maximum power region.

10. The improvement as set forth in claim 7 wherein the phase shifter is a slab of dielectric material fixed in position in the waveguide with the longer dimension of the slab generally parallel to the waveguide walls.

11. The improvement as set forth in claim 8 wherein the dielectric slab is formed so that the front and rear faces thereof are at an angle with respect to the perpendicular height of the waveguide, whereby the phase shift is introduced without substantial discontinuity.

12. The improvement as set forth in claim 9 wherein the waveguide is closed by end members at the source and cavity ends thereof, the end member at said cavity end being positioned at an angle with respect to the perpendicular height of said waveguide thereby to minimize reflection of energy back to said source.

* * * * *